(12) United States Patent
Dora

(10) Patent No.: US 9,534,435 B2
(45) Date of Patent: Jan. 3, 2017

(54) DAMPER FOR HINGES

(75) Inventor: Massimo Dora, Ospitaletto (IT)

(73) Assignee: FARINGOSI HINGES S.R.L., Ospitaletto (BS) (IT)

( * ) Notice: Subject to any disclaimer, the term of this patent is extended or adjusted under 35 U.S.C. 154(b) by 92 days.

(21) Appl. No.: 14/404,438

(22) PCT Filed: Jun. 15, 2012

(86) PCT No.: PCT/IB2012/001169
§ 371 (c)(1),
(2), (4) Date: Jan. 9, 2015

(87) PCT Pub. No.: WO2013/186582
PCT Pub. Date: Dec. 19, 2013

(65) Prior Publication Data
US 2015/0226284 A1    Aug. 13, 2015

(51) Int. Cl.
*E05F 5/10*    (2006.01)
*F16F 9/34*    (2006.01)
(Continued)

(52) U.S. Cl.
CPC . *E05F 5/10* (2013.01); *E05F 5/02* (2013.01); *F16F 9/3415* (2013.01);
(Continued)

(58) Field of Classification Search
CPC .............. E05F 5/02; E05F 5/022; E05F 5/025; E05F 5/06; E05F 5/10; F24C 15/023; Y10T 16/61; Y10T 16/615; Y10T 16/62; Y10T 16/276
See application file for complete search history.

(56) References Cited

U.S. PATENT DOCUMENTS 3,628,638 A * 12/1971 Curchack .................. F16F 9/18
                                                    188/312
4,185,356 A *  1/1980 Kuivalainen ............. E05F 3/12
                                                    16/52
(Continued)

FOREIGN PATENT DOCUMENTS

GB        2087510 A      5/1982
WO      03/014590 A2     2/2003
WO    2005/045278 A1     5/2005

*Primary Examiner* — Jeffrey O Brien
(74) *Attorney, Agent, or Firm* — Lucas & Mercanti, LLP

(57) ABSTRACT

Damper (1) comprising a cylinder (2) containing a damping fluid, at least one piston (3) translatable within said cylinder and defining two damping chambers (4, 5), and a rod (6) for controlling the movement of said at least one piston (3) within said cylinder (2), said damper further comprising at least one first and at least one second narrow passages (7, 8) through which said damping fluid is forced to pass from one to the other of said two damping chambers (4, 5) when said control rod is controllably moved within said cylinder (2), characterized in that said at least one piston (3) is translatable with respect to said control rod (6) on the basis of the speed of said control rod (6), between a first position (P1), in which said at least one piston (3) prevents said damping fluid from passing through said at least one first narrow passage (7) and a second position (P2) in which said at least one piston (3) allows said damping fluid to pass through said at least one first narrow passage (7), and in that it comprises at least one first elastic member (9) constrained to said at least one piston (3) and deformable and/or displaceable with respect to said at least one piston (3) on the basis of the speed of said at least one control rod (6) to prevent said fluid from passing through said at least one second narrow passage (8), at least when said at least one piston (3) is in said second position (P2).

13 Claims, 5 Drawing Sheets

(51) Int. Cl.
*F16F 9/512* (2006.01)
*F24C 15/02* (2006.01)
*E05F 5/02* (2006.01)

(52) U.S. Cl.
CPC .......... *F16F 9/5126* (2013.01); *F24C 15/023* (2013.01); *E05Y 2201/21* (2013.01); *E05Y 2201/256* (2013.01); *E05Y 2201/264* (2013.01); *E05Y 2900/308* (2013.01); *Y10T 16/61* (2015.01)

(56) References Cited

U.S. PATENT DOCUMENTS

| | | | | | |
|---|---|---|---|---|---|
| 4,433,759 | A | * | 2/1984 | Ichinose | ................ E05C 17/30 16/51 |
| 5,507,070 | A | * | 4/1996 | Spyche, Jr. | ............ A61G 17/02 16/49 |
| 8,104,140 | B2 | * | 1/2012 | Bassi | ........................ E05F 5/08 16/82 |
| 8,336,166 | B2 | * | 12/2012 | Kim | ........................ E05F 5/006 16/82 |
| 8,683,653 | B2 | * | 4/2014 | Bettinzoli | ............ E05F 1/1261 16/286 |
| 2010/0148646 | A1 | * | 6/2010 | Bettinzoli | ............ E05F 1/1261 312/326 |
| 2010/0287729 | A1 | * | 11/2010 | Jin | .......................... E05F 3/108 16/52 |

* cited by examiner

DAMPER FOR HINGES

CROSS-REFERENCE TO RELATED APPLICATION

This application is a 371 of PCT/IB2012/001169, filed Jun. 15, 2012, the contents of which are incorporated herein by reference.

FIELD OF THE INVENTION

The present invention relates to a damper. Particularly, this damper is used for controlling the movement of a movable member with respect to a fixed member. Only by way of an example, it can be mentioned the door of a kitchen oven or the bonnet of a motor vehicle or the door of a piece of furniture, or the like, in opposition to the corresponding abutment portion which is integral with the frame and with respect to which the movable member is moved. Still more particularly, such a damper is used to automatically reduce the speed of said movable member when the latter is subjected to an excessive force which suddenly increases the speed thereof. In any case it is to be highlighted that, although such a device can be used in all the fields of the art in which a movable member is required to be controllably opened and/or closed with respect to a fixed member, particular reference will be made hereinafter to the field of kitchen ovens without for this reason limiting the protection scope of the present invention.

BACKGROUND OF THE INVENTION

According to the prior art, traditional dampers comprise a cylinder containing a damping fluid, at least one piston translatable within said cylinder and defining two damping chambers, and at least one rod for controlling the movement of said at least one piston within said cylinder. In addition, these devices have one or more narrow passages obtained between the piston and/or the cylinder and/or the rod for allowing said damping fluid to be forcedly moved from one to the other of said two damping chambers when said piston is controllably moved within the cylinder in both the directions of movement. In this way, when the speed of the rod exceeds a certain preset threshold value, the stroke of the piston, and therefore of the rod, can be slowed down by occluding one or more narrow passages on the basis of the speed of the damper rod while the piston is running within the cylinder. According to the prior art, International Application WO2005/045278 describes a damper which allows the speed of the control rod to be reduced when a certain forward speed thereof is exceeded. In fact, in this patent application, the piston has a plurality of side narrow passages, or grooves, spaced from each other, and it is equipped with a disc integral with the piston but rotatable and translatable with respect thereto and provided with a corresponding plurality of passages spaced from each other. Such a disc is rotated with respect to the piston on the basis of both the forward direction and the movement speed of the rod so as to move the above mentioned passages away from the above mentioned narrow passages or grooves of the piston as the speed of the rod is increased. Thus, the section provided by the narrow passages for the dumping fluid passing therethrough is reduced, thereby increasing the resistance against the passage of said fluid and consequently slowing the rod.

In these dampers, therefore, the resistance provided by one or more narrow passages is changed according to the speed of the rod so as to reduce the speed of the latter in case of a sudden acceleration thereof such as, for example, when the rod is subjected to an excessive external force. For example, this is the case when the door of the oven is closed with an excessive force, leading to the risk of a great, dangerous impact of the door itself against the abutment portion of the oven.

However, the dampers of the prior art are not free of drawbacks. In fact, these dampers are quite complex from a constructional point of view, and therefore, their assembly is time-consuming and requires a considerable accuracy.

Accordingly, an object of the present invention is to provide a damper which, in addition to be able to reduce automatically the speed of the rod when the external force acting thereon is suddenly increased, is also structurally simple.

Another object of the present invention is to provide a damper which is also functionally simpler than those of the prior art.

SUMMARY OF THE INVENTION

These objects are achieved by the present damper comprising a cylinder containing a damping fluid, at least one piston translatable within said cylinder and defining two damping chambers, and a rod for controlling the movement of said at least one piston within said cylinder, said damper further comprising at least one first and at least one second narrow passages through which said damping fluid is forced to pass from one to the other of said two damping chambers when said control rod is controllably moved within said cylinder, characterized in that said at least one piston is translatable with respect to said control rod on the basis of the speed of said control rod, between a first position, in which said at least one piston prevents said damping fluid from passing through said at least one first narrow passage and a second position in which said at least one piston allows said damping fluid to pass through said at least one first narrow passage, and in that it comprises at least one first elastic member constrained to said at least one piston and deformable and/or displaceable with respect to said at least one piston on the basis of the speed of said at least one control rod between an arrangement in which said damping fluid is prevented from passing through said at least one second narrow passage, at least when said at least one piston is in said second position, and an arrangement in which said damping fluid is allowed to pass through said at least one second narrow passage.

This solution enables to obtain a damper which is extremely functional and structurally simple. In fact, the piston becomes movable with respect to the rod on the basis of the speed, and furthermore, the first elastic member, which is integral with the piston, is also deformed or displaced with respect to the piston on the basis of the speed of the rod. In practice, when the piston has reached its second position, the elastic member is deformed or displaced with respect to the piston so as to occlude the second narrow passage and then allowing the damping fluid— usually oil—to pass only through the first narrow passage. Since said at least one first narrow passage is dimensioned with respect to said at least one second narrow passage so as to provide an increased resistance to the passage of the damping fluid, it follows that, when the speed of the rod is increased, the resistance to the forward movement of the piston within the cylinder is also increased, and then the speed of the rod will be decreased.

Particularly, said damper comprises as well a second deformable elastic member directly or indirectly arranged between said rod and said at least one piston and subjected to the action of said at least one piston, at least when said at least one piston is translationally moved between said first and second positions. This second deformable member, which is selected from an annular gasket (o-ring), a spring or the like, is deformed as the speed of the rod is increased because said at least one piston moving forward within the cylinder experiences an increased resistance. In fact, the force acting on the piston increases with the speed of the piston within the cylinder according to a well-known physical formula. Therefore, the pressure exerted by the piston on said second elastic member is increased in such a way to deform the second elastic member, and the piston can be consequently moved from its first position to its second position. Thus, this movement of the piston allows the fluid to access said at least one first narrow passage.

According to an embodiment of the invention, said control rod comprises at least one low-profile diametrical portion in which said at least one piston and said at least one second elastic member are accommodated, and wherein said at least one elastic member is preferably pre-compressed by said at least one piston when said at least one piston is in its first position. In this way, when the rod is sliding within the cylinder, if a certain preset speed is exceeded, then the piston begins to slide along said low-profile diametrical portion serving as a guide, the piston being in its first position under normal speed conditions as it is kept in position by the second elastic member. This translational movement causes the second elastic member to be deformed and the first narrow passage to be gradually but continuously opened. In the meanwhile, the first elastic member begins to be deformed in such a way to occlude said at least one second narrow passage, thereby preventing the damping fluid from passing through said at least one first narrow passage. According to this embodiment, said at least one first narrow passage is dimensioned with respect to said at least one second narrow passage so as to provide an increased resistance to the damping fluid passing from one to the other of said two damping chambers. Therefore, when the speed of the rod is increased while only the first narrow passage is open as explained above, the piston and the rod are slowed down in their stoke. According to an embodiment of the invention, said at least one piston is provided with at least one truncated-conical portion, and said at least one first elastic member is slidingly constrained to said at least one piston at said at least one truncated-conical portion, on the basis of the direction of movement of the control rod. This solution allows the behavior of the first deformable member to be changed on the basis of the slide direction of the control rod. In fact, when the rod slides in a direction in which said conical portion is decreased in diameter, for example when closing the door of an oven, said at least one first elastic member is pushed by the damping fluid towards the increased diameter of said at least one conical portion so as to be slightly expanded. In this position, said at least one first elastic member is ready to be radially deformed in order to occlude said at least one second narrow passage when the speed of the rod exceeds a certain value. In contrast, when the control rod slides in a direction in which said conical portion is increased in diameter, for example when opening the door of an oven, said at least one first elastic member is pushed by the damping fluid towards the decreased diameter of said at least one conical portion. In this position, although said at least one first elastic member can still be radially deformed under the pressure of the damping fluid, it cannot obstruct said at least one second narrow passage when the speed of the rod exceeds a certain value. Thus, said at least one first elastic member is prevented from occluding said at least one second narrow passage along this direction of movement of the rod.

Still according to an embodiment of the invention, said at least one first narrow passage is defined between the inner surface of said at least one piston and the outer surface of said control rod, preferably at said at least one low-profile diametrical portion formed in said control rod, and said at least one second narrow passage is defined between the inner surface of said cylinder and the outer surface of said at least one piston.

According to a further aspect of the present invention, said at least one second narrow passage can also include one or more through-holes formed in said piston and arranged in such a way that said one or more through-holes are respectively opened or occluded when said at least one first elastic member is deformed and/or displaced with respect to the piston.

According to the invention, a hinge for closing/opening doors of kitchen ovens is claimed, which includes a damper according to one or more of claims 1 to 9.

BRIEF DESCRIPTION OF THE DRAWINGS

For purposes of illustrations and not limitative, certain embodiments of the present invention will be described with reference to the accompanying figures, in which.

DETAILED DESCRIPTION OF SOME PREFERRED EMBODIMENTS OF THE INVENTION

Figure 1:
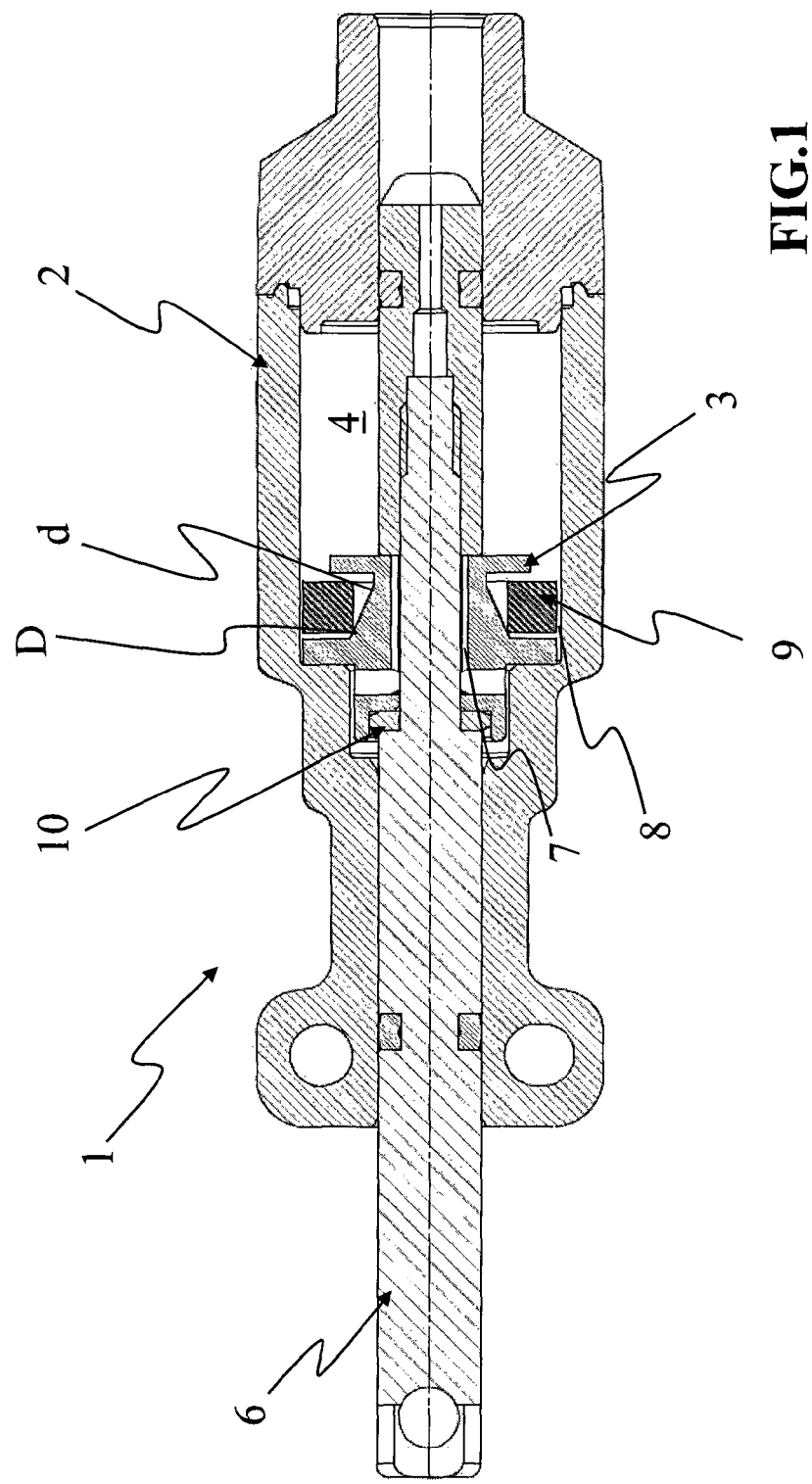
FIG. 1 is a longitudinal sectional view of the damper according to a first preferred embodiment of the invention.

Referring particularly to these figures, with numerical reference 1 a damper according to the invention is shown. Note that like reference numerals have been used to denote like components of the damper in the two embodiments of the present invention as shown herein.

FIG. 1 shows a damper 1 according to a first preferred embodiment of the present invention, comprising a cylinder 2 containing a damping fluid (not shown herein) of the type comprising oil, for example, and a piston 3 which is substantially cylindrical in shape and translatable within said cylinder 2 so as to define two damping chambers 4, 5. The damper 1 also comprises a rod 6 to control the movement of the piston 3 within the cylinder 2, and a first and second narrow passages 7, 8 through which the oil is forced to pass from one to the other of the two damping chambers 4, 5 when the control rod 6 is controllably moved within the cylinder 2. Practically, the damper 1 according to the invention is also known as a double-acting damper because two different damping laws can be exploited as required depending on the forward direction of the rod into the cylinder. Incidentally it should be noted that, although the present embodiment provides one piston and only two narrow passages formed between the piston and the cylinder, however, the scope of the present invention also embraces an embodiment which provides a plurality of pistons and a plurality of narrow passages the latter being formed, for example, only in the piston or between the piston and the rod or between the piston and the cylinder.

Advantageously, the piston 3 is translatable with respect to the control rod 6, on the basis of the speed of said control rod 6, between a first position P1 (FIG. 2) in which said piston 3 prevents said damping fluid (e.g. oil) from passing through said first narrow passage 7, and a second position P2 (FIG. 3) in which said piston 3 allows said damping fluid to pass through said first narrow passage 7. Additionally, such a damper 1 also comprises a first elastic member 9 of the type comprising for example a seal, preferably a rubber O-ring, constrained to the piston 3 and deformable and/or restrictedly displaceable with respect to said piston 3, on the basis of the speed of said control rod 6, between an arrangement (configuration and/or relative position with respect to said piston 3) in which it prevents the damping fluid from passing through said second narrow passage 8, at least when said piston 3 is in said second position P2, and an arrangement (configuration and/or position with respect to the piston 3) in which it allows the damping fluid to pass through said second narrow passage 8.

Note that, in the embodiment of the invention as described herein, the first elastic member 9 is both deformable and axially displaceable with respect to the piston 3 and indeed, as it will be seen, due to the special geometrical configuration of said piston, which is partially wedge-shaped, the displacement of such a first elastic member 9 with respect to the piston 3 at least partially determines the deformation of the piston, and then it determines whether the afore said second narrow passage 8 is closed or open.

However, the protection scope of the following claims embraces any other embodiment of the elastic member 9 which is deformable and/or displaceable with respect to the piston 3 so as to close or open the second narrow passage 8 due to the deformation and/or displacement thereof with respect to said piston 3, as it will be evident to one skilled in the art.

Practically, when the piston 3 has reached its second position P2, the first narrow passage 7 is open and the second narrow passage 8 is closed because the afore said first elastic member 9 has been simultaneously deformed or displaced with respect to said piston 3. Both the translation of the piston 3 along the control rod 6 and the deformation, or relative displacement, of said first elastic member 9 are caused by a speed increase of the control rod 6 and by a consequent pressure increase of the fluid acting onto both the piston 3 and the first elastic member 9. Note that said first narrow passage 7 is preferably dimensioned with respect to said second narrow passage 8 so as to provide an increased resistance (e.g. by having a passage reduced in cross-section with respect to the second narrow passage 8) to the damping fluid passing from one to the other of the two damping chambers 4, 5. Thus, when the flow is allowed to pass through the first narrow passage 7 and prevented from passing through the second narrow passage 8, the resistance experienced by the piston 3 moving forward is increased and consequently the control rod 6 is slowed down.

According to the embodiment illustrated herein in FIGS. 1-4, the damper 1 comprises either a second deformable elastic member 10 of the type comprising a rubber O-ring, for example, or a spring (although not shown herein) or the like, which is positioned directly between the afore said control rod 6 and the afore said piston 3 and subjected to the action of said piston 3 at least when said piston 3 is moved between said first and second positions P1, P2. Particularly, said control rod 6 includes a low-profile diametrical portion 11 accommodating said piston 3 and said second elastic member 10. Said second elastic member 10 is pre-compressed by said piston 3 when the piston is in its first position P1. Thus, when the speed of the rod is low, said first narrow passage 7 is closed, while said second narrow passage 8 is open.

Furthermore, according to an embodiment of the invention, said first narrow passage 7 is defined between the inner surface 3a of said piston 3 and the external surface 6a of said control rod 6, preferably at the afore said low-profile diametrical portion 11, and said second narrow passage 8 is defined between the inner surface 2a of said cylinder and the outer surface 3b of said piston 3.

According to the invention, said piston 3 is provided with a truncated-conical portion 12 comprising, at the ends thereof, end-of-stroke surfaces for the first elastic member 9 on which such a first elastic member 9 is preferably slidingly constrained. This solution, which allows the elastic member 9 to be axially displaced with respect to the piston 3, as well as to be translationally moved along with the piston 3 at least when it has reached the end-of-stroke portions of the truncated-conical portion 12, also allows the behavior of the first deformable elastic member 9 to be changed on the basis of the slide direction of the control rod 6. In fact, when the control rod 6 slides in a direction in which said conical portion 12 has a diameter less than d (FIGS. 2 and 3), for example when closing the door of an oven, said first elastic member 10 is pushed by the damping fluid towards the increased diameter D of said conical portion 12 so as to be slightly expanded. In this position, said first elastic member 9 is ready to be radially deformed and, if the speed of the control rod 6 exceeds a certain value, it closes said second narrow passage 8. In contrast, when the control rod 6 slides in a direction in which said conical portion has an increased diameter D (FIG. 4), for example when opening the door of an oven, said first elastic member 9 is pushed by the damping fluid towards the reduced diameter d of said at least one conical portion. In this position, even though said first elastic member 9 can be radially deformed under the pressure of the damping fluid, it cannot close said at least one second narrow passage when the speed of the rod exceeds a certain value. In fact, in this position, the first elastic member 9 is more loosely restrained to the truncated-conical portion 12 of the piston 3.

Figure 2:
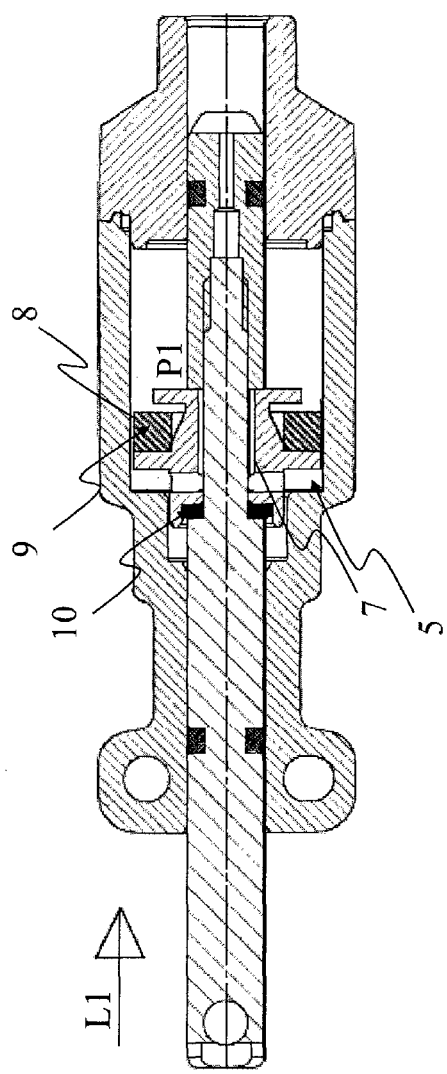
FIG. 2 is a longitudinal sectional view of the damper of FIG. 1 with the control rod operated at a low speed along a first forward direction.
Figure 3:
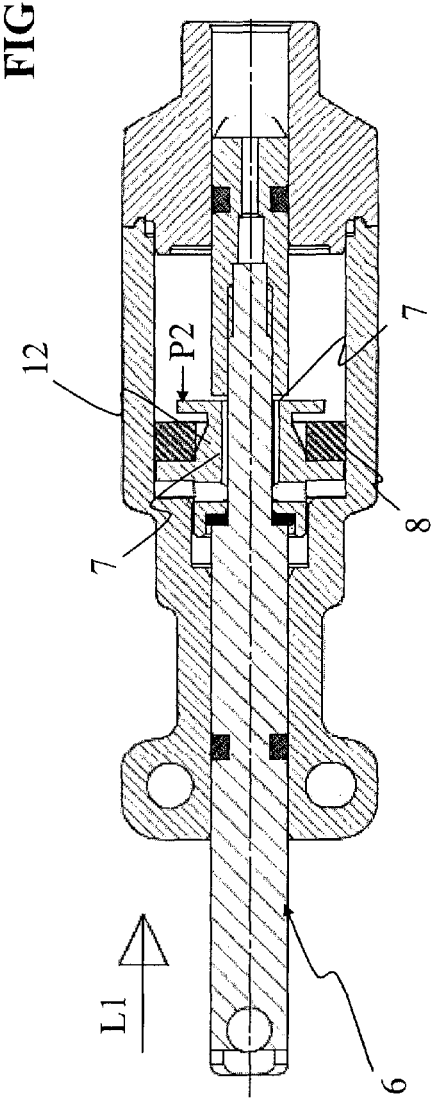
FIG. 3 is a longitudinal sectional view of the damper of FIG. 1 with the control rod operated at a high speed along a first forward direction.
Figure 4:
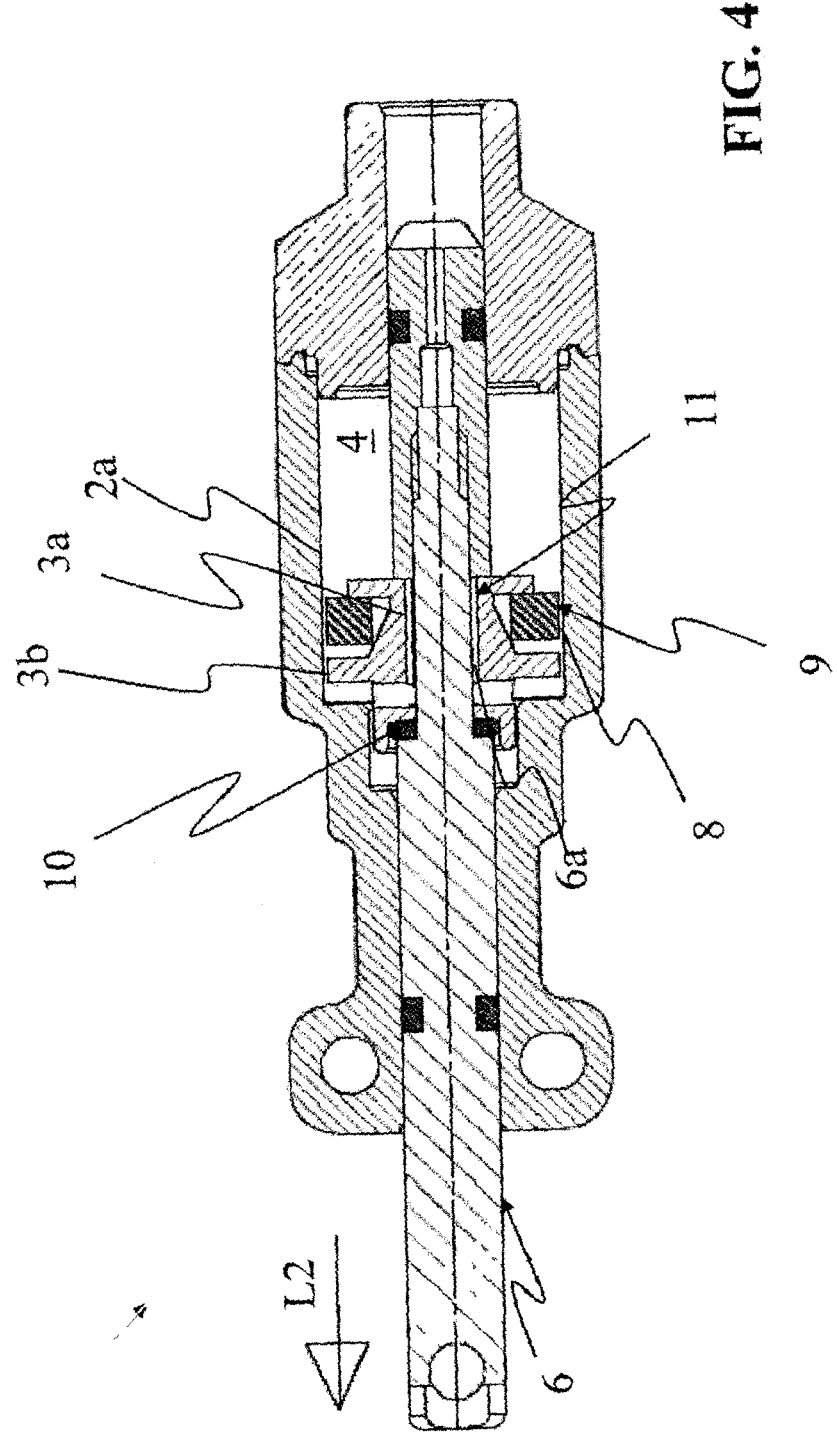
FIG. 4 is a longitudinal sectional view of the damper of FIG. 1 with the control rod operated along a second forward direction.

The operation of the damper 1 is illustrated in FIGS. 2 to 4.

FIG. 2 illustrates the situation in which the control rod 6 is moved along a first forward direction L1 at a low speed. Such a scenario may occur, for example, when closing the door of a kitchen oven. In this case, the piston is initially in its first position P1, in which said second elastic member 10 is pre-compressed within said low-profile diametrical portion 11 of the rod 6. In this scenario, said first deformable elastic member 9 is displaced toward the increased diameter D of said truncated-conical portion 12 of said piston 3. In this condition, i.e. when the speed is not high, said first elastic member 9 is not deformed or only partially deformed, and however, it cannot prevent the damping fluid from passing through said second narrow passage 8.

In FIG. 3, the control rod 6 is still moved along the same forward direction L1 but at a speed exceeding a preset threshold value. In this case, said second elastic member 10 is deformed by the piston 3 which presses it against said control rod 6. This causes both the piston 3 to be moved towards said second position P2 and said first narrow passage 7 to be opened. Simultaneously, the control rod 6 running at high speed also causes the force acting on said first elastic member 9, via the damping fluid, to be increased in such a way that said first elastic member 9 is radially deformed, thus occluding said second narrow passage 8. Therefore, when said piston 3 is moved to its second position P2 and the first elastic member 9 is deformed due to the high speed of translational movement initially imparted to the control rod 6, said first narrow passage 7 is opened and the second narrow passage 8 is closed in such a way that the control rod 6 is significantly slowed down or, in other words, the resistance against the movement of said rod 6 is considerable.

In FIG. 4, the control rod 6 is moved along a second direction L2. In this scenario, the first deformable elastic member 9 is displaced towards the decreased diameter d of said truncated-conical portion 12 of the piston 3 due to the pressure of the damping fluid. In this case, said first elastic member 9 is prevented from occluding said second narrow passage 8 regardless of the speed of the control rod 6. When the control rod 6 is sliding along said second spatial direction L2, the piston 3 cannot be translationally moved along said rod 6 as it is in direct contact with the rod, whereas said second elastic member 10 is on the opposite side of the forward direction of the rod 6, thereby preventing the damping fluid from passing through said first narrow passage 7.

Figure 5:
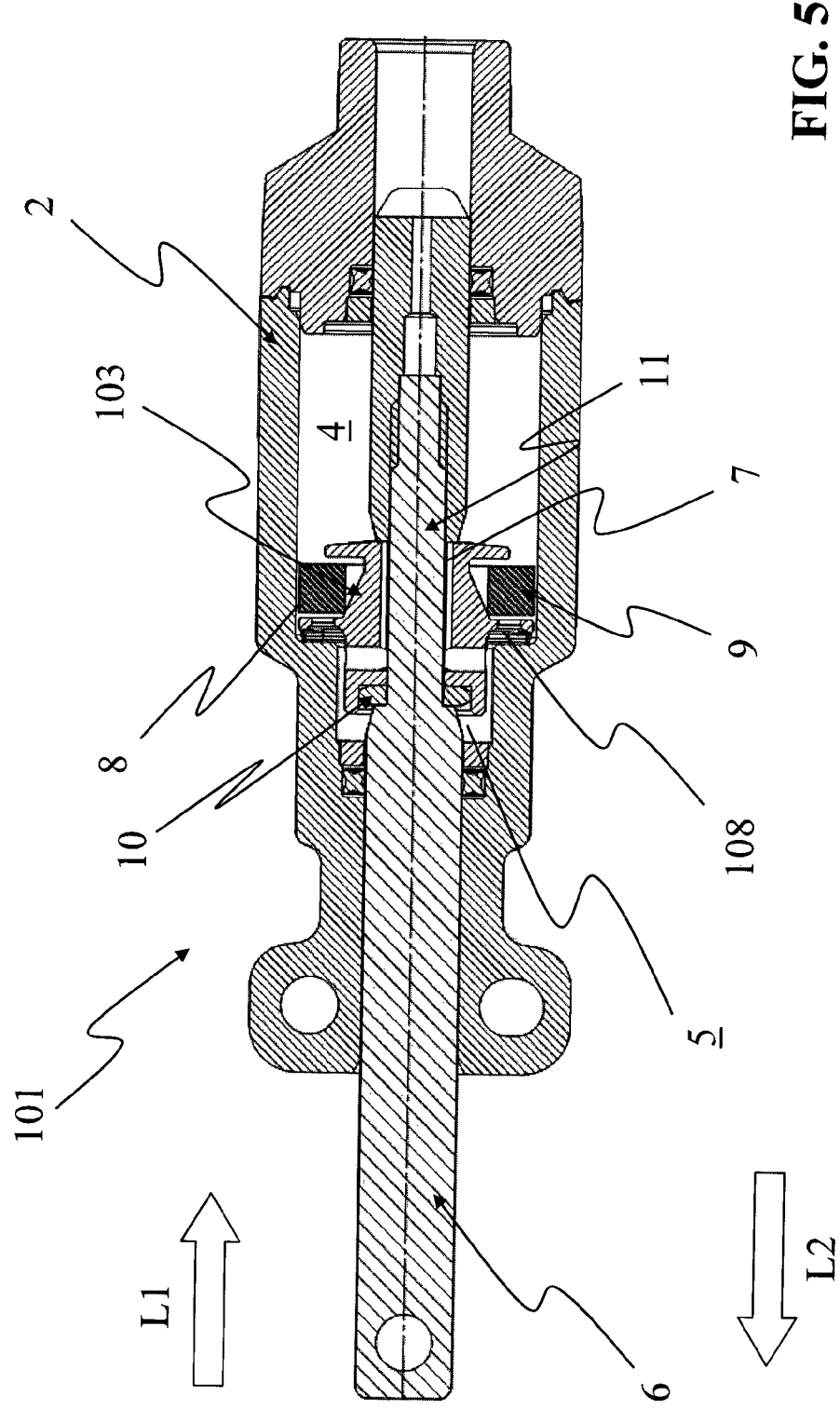
FIG. 5 is a longitudinal sectional view of a damper according to a second embodiment of the present invention.
Figure 6:
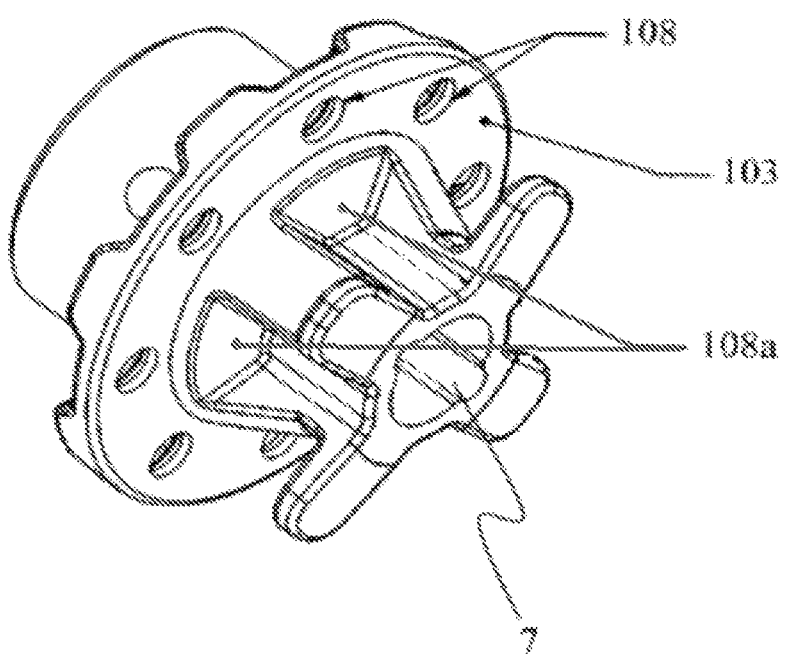
FIG. 6 is an isometric view of the piston used in the damper of FIG. 5.

Now, with reference to the embodiment of the damper 101 of the present invention as depicted in FIGS. 5 and 6, this embodiment is quite similar to that illustrated in FIGS. 1 to 4 except that the piston 103 has a different shape compared to that of FIGS. 1-4 and it is provided with one or more through-holes 108, 108*a* arranged in such a way that the displacement and/or deformation of said first elastic member 9 cause said through-holes to be occluded or opened.

More in detail, the damper 101 illustrated in FIG. 5 comprises, like the damper 1 of FIGS. 1-4, a cylinder 2 containing a damping fluid such as oil, at least one piston 103 translatable within the cylinder 2 and defining two damping chambers 4, 5, and a rod 6 for controlling the movement of said at least one piston 103 within said cylinder 2.

The damper 101 includes as well at least one first narrow passage 7 comprising outlets which are preferably formed between the inner surface of the piston 103 and the outer surface of the control rod 6 which is coupled to such an inner surface of the piston 103, and a second narrow passage comprising, in the particular embodiment of the invention as shown herein, a port 8 formed between the inner surface of the cylinder 2 and the outer surface of the piston 103, and one or more through-holes or outlets 108, 108*a* formed on the piston 103 itself.

Particularly, note that the through-holes 108, 108*a* are faced to that surface of the piston 103 which is intended to be engaged with the first elastic member 9 in order to act as an end-of-stroke portion thereof when the control rod 6 is moved along a direction L1 (to the right in FIG. 5), thereby said through-holes connect the chamber 4 with the chamber 5.

It should be noted that, alternatively to the case described above and depicted in FIGS. 5 and 6, said second narrow passage can comprise only the through-holes 108, 108*a* obtained in the piston 103 without the afore said port 8 between the piston 103 and the cylinder 2.

Therefore, the narrow passages 7, 8 and 108, 108*a* allow said damping fluid (oil) to be forcedly moved from one to the other of the afore said two damping chambers 4, 5 while the control rod 6 is moved within the cylinder 2 under the user control.

As already described with reference to the damper 1 shown in FIGS. 1-4, the afore said at least one piston 103 of the damper 101 is translatable with respect to the corresponding control rod 6, on the basis of the speed of the control rod 6 itself, between a first position, in which the piston 103 prevents the damping fluid from passing through said at least one first narrow passage 7, and a second position in which such a piston 103 allows the damping fluid to pass through the afore said first narrow passage 7.

In addition, similarly to the damper of FIGS. 1-4, the damper 101 of FIG. 5 comprises at least one first elastic member 9 which is constrained to said at least one piston 103 and which is deformable and/or displaceable with respect to said piston 103, on the basis of the speed of the afore said control rod 6, between an arrangement in which the damping fluid is prevented from passing through the afore said at least one second narrow passage 8, 108, 108*a*, at least when said piston 103 is its above mentioned second position, and an arrangement in which the damping fluid is allowed to pass through said at least one second narrow passage 8, 108, 108*a*.

In a completely similar way to the damper 1 (see FIG. 4), when the control rod 6 of the damper 101 is moved along the second direction L2, the afore said first deformable elastic member 9 is displaced towards the area in which the truncated-conical portion of the piston 103 is decreased in diameter due to the pressure of the damping fluid and, in this position, said first elastic member 9 cannot occlude said side narrow passage 8 as well as the through-holes 108, 108*a* regardless of the speed of the control rod. Moreover, when the control rod 6 is sliding along the second direction L2, the piston 103 cannot be translationally moved along said rod 6 because it is in direct contact with said control rod 6, whereas said second elastic member 10 is on the opposite side of the forward direction of the rod 6 itself. It results that the first narrow passage 7 is occluded by the piston 103, on the contrary the damping fluid can pass from the chamber 5 towards the chamber 4 because of the second narrow passage comprising the port 8 and the through-holes 108, 108*a*.

As also shown in FIG. 6, the implementation of said at least one second narrow passage 8 comprising one or more through-holes 108, 108*a* in the piston 103 as well as the port between the outer surface of such a piston 103 and the inner surface of the respective cylinder 2, increases the section of said second narrow passage 8 through which the damping fluid can pass, thereby providing a decreased resistance to the movement of the control rod 6 when the second narrow passage 8 is left open by the first elastic member 9.

It should be noted that, although the embodiment illustrated herein provides that the speed of the control rod can be limited only along one forward direction, however, an embodiment in which, for example, there are two opposed pistons with a truncated-conical portion arranged symmetrical to each other and two first and second deformable elastic members constrained to the respective piston and respectively acting thereon, would cause the rod to be slowed down in both the slide directions when its speed exceeds a certain value which is considered critical.

The present damper 1 can be incorporated into a hinge (not shown herein) for closing/opening doors of kitchen ovens.

The invention claimed is:

1. Damper comprising:
   a cylinder containing a damping fluid, said cylinder having a first end and a second end,
   at least one piston within said cylinder and defining two damping chambers, said at least one piston being translatable within said cylinder between said first end and said second end,
   a rod for controlling the movement of said at least one piston within said cylinder,
   said damper further comprising at least one first narrow passage and at least one second narrow passage through which said damping fluid is forced to pass from one to the other of said two damping chambers when said control rod is controllably moved within said cylinder,
   wherein said at least one piston is translatable with respect to said control rod as said control rod moves between said first end and said second end, said at least one piston is translatable between a first position (P1) as said control rod moves towards said first end at a control rod speed having a preset threshold value, in which said at least one piston allows said damping fluid to pass through said at least one second narrow passage and prevents said damping fluid from passing through said at least one first narrow passage, and a second position (P2) as said control rod moves towards said first end at a control rod speed exceeding said preset threshold value in which said at least one piston allows said damping fluid to pass through said at least one first narrow passage and prevents said damping fluid from passing through said at least one second narrow passage, and
   wherein said damper further comprises at least one first elastic member constrained to said at least one piston and deformable and/or displaceable with respect to said at least one piston, on the basis of the control rod speed, between an arrangement in which said damping fluid is prevented from passing through said at least one second narrow passage, at least when said at least one piston is in said second position (P2), and an arrangement in which said damping fluid is allowed to pass through said at least one second narrow passage at least when said at least one piston is in said first position (P1).

2. Damper according to claim 1, further comprising a second deformable elastic member directly or indirectly arranged between said control rod and said at least one piston and subjected to the action of said at least one piston, at least when said at least one piston is translationally moved between said first and second positions.

3. Damper according to claim 2, wherein said control rod comprises at least one low-profile diametrical portion in which said at least one piston and said at least one second elastic member are accommodated.

4. Damper according to claim 2, wherein said second elastic member is an O-ring or a spring.

5. Damper according to claim 1, wherein said at least one first elastic member comprises an O-ring.

6. Damper according to claim 5, wherein said at least one first elastic member is made of rubber.

7. Damper according to claim 1, wherein said at least one piston is provided with at least one truncated - conical portion, and said at least one first elastic member is slidingly constrained to said at least one piston at said at least one truncated - conical portion, on the basis of the direction of movement of said control rod.

8. Damper according to claim 1, wherein said at least one first narrow passage is defined between the inner surface of said at least one piston and the external surface of said control rod.

9. Damper according to claim 1, wherein said at least one second narrow passage is defined between the inner surface of said cylinder and the outer surface of said at least one piston.

10. Damper according to claim 1, wherein said at least one second narrow passage comprises one or more through-holes formed in said piston.

11. Damper according to claim 1, wherein said at least one first narrow passage is dimensioned with respect to said at least one second narrow passage so as to provide an increased resistance to the damping fluid passing from one to the other of said two damping chambers.

12. Hinge for closing/opening doors of kitchen ovens comprising a damper according to claim 1.

13. Damper according to claim 1, wherein said cylinder has a substantially constant inner diameter over a portion of said cylinder in which said at least one piston is translatable between said first end and said second end of said cylinder.

* * * * *